US007805589B2

(12) United States Patent
Du et al.

(10) Patent No.: US 7,805,589 B2
(45) Date of Patent: Sep. 28, 2010

(54) RELATIVE ADDRESS GENERATION

(75) Inventors: Yun Du, San Diego, CA (US); Chun Yu, San Diego, CA (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 11/469,347

(22) Filed: Aug. 31, 2006

(65) Prior Publication Data

US 2008/0059756 A1    Mar. 6, 2008

(51) Int. Cl.
    *G06F 12/00*    (2006.01)
(52) U.S. Cl. .................... 711/220; 711/202; 345/545
(58) Field of Classification Search ................ 711/220, 711/202; 345/545
    See application file for complete search history.

(56) References Cited

U.S. PATENT DOCUMENTS

| | | | |
|---|---|---|---|
| 4,646,230 A | | 2/1987 | Eguchi |
| 5,490,259 A | * | 2/1996 | Hiraoka et al. ............... 711/202 |
| 5,768,609 A | * | 6/1998 | Gove et al. .................... 712/11 |
| 6,604,191 B1 | | 8/2003 | Flachs et al. |
| 2002/0078320 A1 | * | 6/2002 | Barry et al. .................... 712/24 |
| 2005/0044342 A1 | * | 2/2005 | Wilson ......................... 711/220 |
| 2006/0059315 A1 | * | 3/2006 | Moll ............................. 711/141 |
| 2006/0152519 A1 | * | 7/2006 | Hutchins et al. ............ 345/561 |

OTHER PUBLICATIONS

International Search Report—PCT/US07/077087—International Search Authority—European Patent Office—Dec. 27, 2007.
Written Opinion - PCT/US07/077087 - International Search Authority - European Patent Office - Dec. 27, 2007.

* cited by examiner

*Primary Examiner*—Christian P Chace
*Assistant Examiner*—Hashem Farrokh
(74) *Attorney, Agent, or Firm*—George C. Pappas; James R. Gambale, Jr.

(57) ABSTRACT

Techniques to efficiently handle relative addressing are described. In one design, a processor includes an address generator and a storage unit. The address generator receives a relative address comprised of a base address and an offset, obtains a base value for the base address, sums the base value with the offset, and provides an absolute address corresponding to the relative address. The storage unit receives the base address and provides the base value to the address generator. The storage unit also receives the absolute address and provides data at this address. The address generator may derive the absolute address in a first clock cycle of a memory access. The storage unit may provide the data in a second clock cycle of the memory access. The storage unit may have multiple (e.g., two) read ports to support concurrent address generation and data retrieval.

36 Claims, 9 Drawing Sheets

FIG. 7

| Register Address | Register Bank 0 630a | | | | Register Bank 1 630b | | | | Register Bank 2 630c | | | | Register Bank 3 630d | | | |
|---|---|---|---|---|---|---|---|---|---|---|---|---|---|---|---|---|
| | Thread 0 | | | | Thread 0 | | | | Thread 0 | | | | Thread 0 | | | |
| 0 | P0.X | P1.X | P2.X | P3.X | P0.Y | P1.Y | P2.Y | P3.Y | P0.Z | P1.Z | P2.Z | P3.Z | P0.W | P1.W | P2.W | P3.W |
| 1 | P0.R | P1.R | P2.R | P3.R | P0.G | P1.G | P2.G | P3.G | P0.B | P1.B | P2.B | P3.B | P0.A | P1.A | P2.A | P3.A |
| 2 | P0.u0/P1.u0/P2.u0/P3.u0 | | | | P0.v0/P1.v0/P2.v0/P3.v0 | | | | P0.u1/P1.u1/P2.u1/P3.u1 | | | | P0.v1/P1.v1/P2.v1/P3.v1 | | | |
| 3 | P0.u2/P1.u2/P2.u2/P3.u2 | | | | P0.v2/P1.v2/P2.v2/P3.v2 | | | | P0.u3/P1.u3/P2.u3/P3.u3 | | | | P0.v3/P1.v3/P2.v3/P3.v3 | | | |
| | Thread 1 | | | | Thread 1 | | | | Thread 1 | | | | Thread 1 | | | |
| 4 | P0.X | P1.X | P2.X | P3.X | P0.Y | P1.Y | P2.Y | P3.Y | P0.Z | P1.Z | P2.Z | P3.Z | P0.W | P1.W | P2.W | P3.W |
| 5 | P0.R | P1.R | P2.R | P3.R | P0.G | P1.G | P2.G | P3.G | P0.B | P1.B | P2.B | P3.B | P0.A | P1.A | P2.A | P3.A |
| 6 | P0.u0/P1.u0/P2.u0/P3.u0 | | | | P0.v0/P1.v0/P2.v0/P3.v0 | | | | P0.u1/P1.u1/P2.u1/P3.u1 | | | | P0.v1/P1.v1/P2.v1/P3.v1 | | | |
| 7 | P0.u2/P1.u2/P2.u2/P3.u2 | | | | P0.v2/P1.v2/P2.v2/P3.v2 | | | | P0.u3/P1.u3/P2.u3/P3.u3 | | | | P0.v3/P1.v3/P2.v3/P3.v3 | | | |
| | Thread 2 | | | | Thread 2 | | | | Thread 2 | | | | Thread 2 | | | |
| 8 | P0.X | P1.X | P2.X | P3.X | P0.Y | P1.Y | P2.Y | P3.Y | P0.Z | P1.Z | P2.Z | P3.Z | P0.W | P1.W | P2.W | P3.W |
| 9 | P0.R | P1.R | P2.R | P3.R | P0.G | P1.G | P2.G | P3.G | P0.B | P1.B | P2.B | P3.B | P0.A | P1.A | P2.A | P3.A |
| 10 | P0.u0/P1.u0/P2.u0/P3.u0 | | | | P0.v0/P1.v0/P2.v0/P3.v0 | | | | P0.u1/P1.u1/P2.u1/P3.u1 | | | | P0.v1/P1.v1/P2.v1/P3.v1 | | | |
| 11 | P0.u2/P1.u2/P2.u2/P3.u2 | | | | P0.v2/P1.v2/P2.v2/P3.v2 | | | | P0.u3/P1.u3/P2.u3/P3.u3 | | | | P0.v3/P1.v3/P2.v3/P3.v3 | | | |
| | Thread 3 | | | | Thread 3 | | | | Thread 3 | | | | Thread 3 | | | |
| 12 | P0.X | P1.X | P2.X | P3.X | P0.Y | P1.Y | P2.Y | P3.Y | P0.Z | P1.Z | P2.Z | P3.Z | P0.W | P1.W | P2.W | P3.W |
| 13 | P0.R | P1.R | P2.R | P3.R | P0.G | P1.G | P2.G | P3.G | P0.B | P1.B | P2.B | P3.B | P0.A | P1.A | P2.A | P3.A |
| 14 | P0.u0/P1.u0/P2.u0/P3.u0 | | | | P0.v0/P1.v0/P2.v0/P3.v0 | | | | P0.u1/P1.u1/P2.u1/P3.u1 | | | | P0.v1/P1.v1/P2.v1/P3.v1 | | | |
| 15 | P0.u2/P1.u2/P2.u2/P3.u2 | | | | P0.v2/P1.v2/P2.v2/P3.v2 | | | | P0.u3/P1.u3/P2.u3/P3.u3 | | | | P0.v3/P1.v3/P2.v3/P3.v3 | | | |
| | ... | | | | ... | | | | ... | | | | ... | | | |

RELATIVE ADDRESS GENERATION

BACKGROUND

I. Field

The present disclosure relates generally to electronics, and more specifically to techniques for generating relative addresses.

II. Background

Processors are widely used for various applications such as communication, computing, data networking, etc. A processor may perform various operations on data stored in a storage unit, which may be a register file, a random access memory (RAM), etc. The data for an operation may be specified by either an absolute address or a relative address. An absolute address points to a specific location in the storage unit where the data is stored. A relative address is given by a base address and an offset. The base address points to a reference location in the storage unit. The offset indicates the distance between the reference location and the actual location where the data is stored. A relative address is typically converted to an absolute address, which is then used to fetch the desired data from the storage unit.

As an example, an instruction to add two operands may be given as:

add r0, x0[r1+15], r2.

The first operand is stored in register/location r2. The second operand is stored at a location determined by a base value stored in register r1 and an offset of 15. The result of the sum of the two operands is stored in register/location r0.

The above instruction is typically converted to two instructions, as follows:

add a0, r1, 15 add r0, x0[a0], r2.

The first instruction computes an absolute address for the second operand by summing the base value in register r1 with the offset of 15 and then storing the absolute address in register a0. The second instruction computes the sum of the two operands, with the second operand being determined by the absolute address computed by the first instruction. An arithmetic logic unit (ALU) may perform the computation for both the first and second instructions.

Converting a single instruction with relative addressing to two instructions may be undesirable for several reasons. First, the computation of the absolute address by the first instruction consumes ALU resources. Second, longer delay may be experienced to complete the two instructions in a sequential order, since the second instruction is dependent on the result of the first instruction. This delay penalty is more severe when the ALU have multiple stages. The longer delay due to the multiple ALU stages may adversely impact performance.

There is therefore a need in the art for techniques to efficiently handle relative addressing.

SUMMARY

Techniques to efficiently handle relative addressing are described herein. In an embodiment, a processor includes an address generator and a storage unit. The address generator receives a relative address comprised of a base address and an offset, obtains a base value for the base address, sums the base value with the offset, and provides an absolute address corresponding to the relative address. The storage unit receives the base address and provides the base value to the address generator. The storage unit also receives the absolute address and provides data at this address. The address generator may derive the absolute address in a first clock cycle of a memory access. The storage unit may provide the data in a second clock cycle of the memory access. The storage unit may have multiple (e.g., two) read ports to support concurrent address generation and data retrieval.

In another embodiment, a processor includes multiple address generators and multiple register banks. The address generators receive relative addresses and provide absolute addresses. The register banks receive the absolute addresses and provide data at these addresses. The register banks may also receive base addresses for the relative addresses and provide base values. The generators may sum offsets for the relative addresses with the base values to obtain the absolute addresses. The processor may further include an address crossbar, a data crossbar, and multiple ALUs. The address crossbar couples the outputs of the address generators to the register banks. The data crossbar provides the data from the register banks to the ALUs. The ALUs operate on the data from the register banks, e.g., for multiple pixels, concurrently.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 7 shows storage of graphics data in the register banks.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1A:
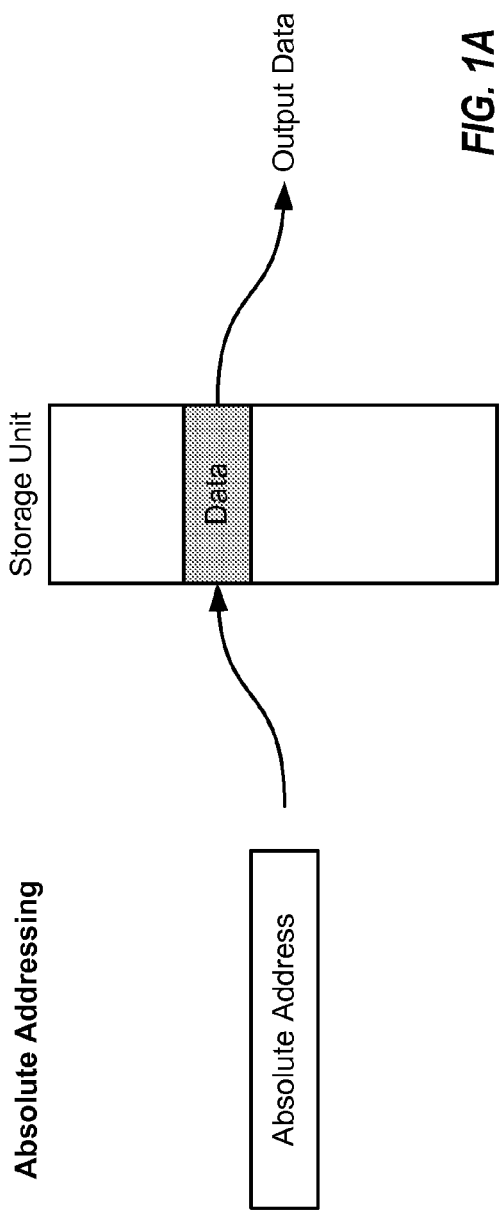
FIGS. 1A and 1B show absolute and relative addressing, respectively.

FIG. 1A shows a read operation with absolute addressing. An absolute address points to a location in a storage unit, which may be a memory, a register bank, etc. The data stored at this location is provided as the output data.

Figure 1B:
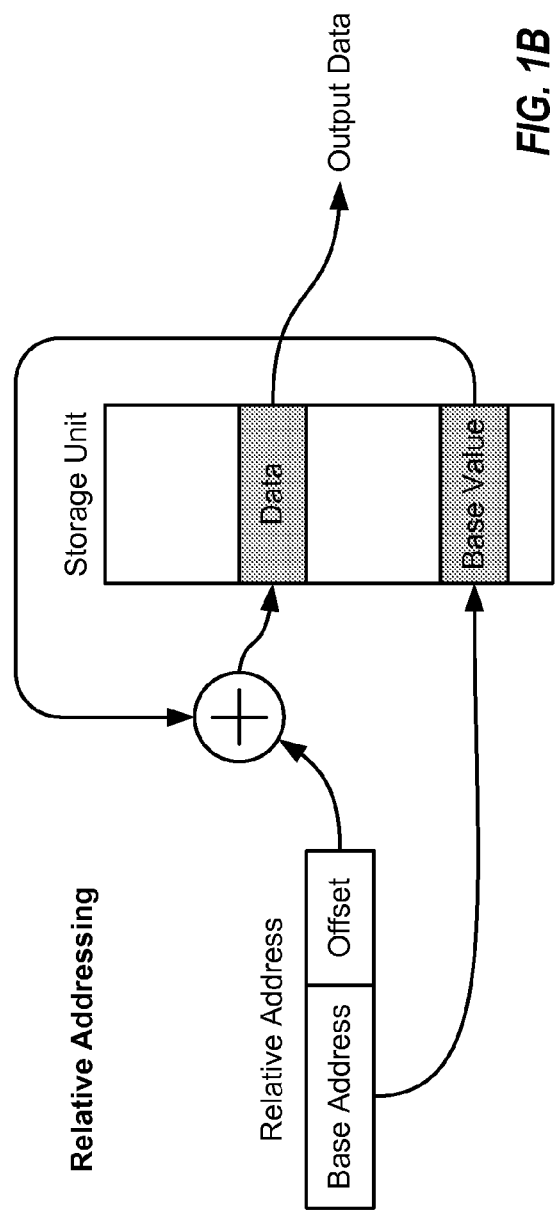

FIG. 1B shows a read operation with relative addressing. A relative address is composed of a base address and an offset. The base address points to a location in a storage unit that stores a base value. The base value is summed with the offset to generate an absolute address corresponding to the relative address. The base value or the offset may be a negative value, but the absolute address is typically a positive value. The data stored at the location pointed to by the absolute address is provided as the output data.

Figure 2:
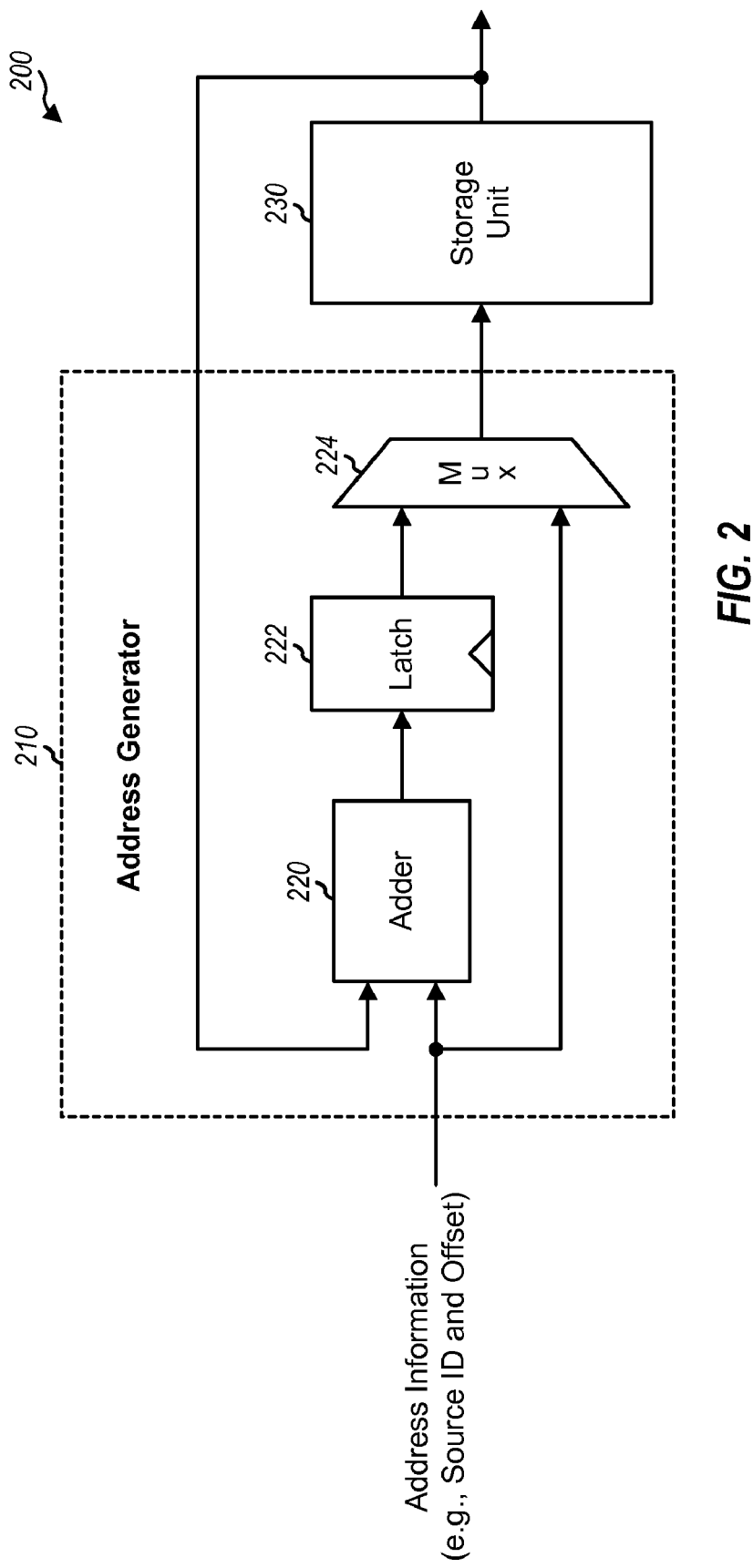
FIG. 2 shows a storage structure supporting relative addressing.

FIG. 2 shows a block diagram of an embodiment of a storage structure 200 that efficiently supports memory access with relative addressing. Storage structure 200 includes an address generator 210 and a storage unit 230. Storage structure 200 receives an absolute address or a relative address and provides data (e.g., an operand) at the location indicated by the received address.

Address generator 210 receives address information, which may comprise a source identifier (ID) and an offset. The source ID may be part of an instruction or may come from some other source, e.g., a buffer. The source ID may contain an absolute address or a base address. For a relative address, an adder 220 receives an output from storage unit 230 and the offset, sums the two inputs, and provides the result to a latch 222. A multiplexer (Mux) 224 receives the output of latch 222 and the address information on two inputs and provides one of the two inputs to storage unit 230.

If the address information comprises an absolute address, then multiplexer 224 provides the absolute address directly to storage unit 230, which then provides data at the location indicated by the absolute address. If the address information comprises a relative address, then a corresponding absolute address is computed and provided in two clock cycles. In the first clock cycle, multiplexer 224 provides the base address in the address information (e.g., the source ID) to storage unit 230, which then provides the base value to adder 220. Adder 220 then sums the offset in the address information with the base value from storage unit 230 and provides the absolute address to latch 222. In the second clock cycle, multiplexer 224 provides the absolute address from latch 222 to storage unit 230, which then provides data at the location indicated by the absolute address.

Adder 220 may be a simple adder that can sum two integer values and provide an integer result. Adder 220 may be implemented with any design known in the art and is typically much less complex than an ALU. Storage unit 230 may be a bank or an array of registers that are assigned different unique addresses. Storage unit 230 may also be other types of storage such as, e.g., a RAM, a synchronous RAM (SRAM), a synchronous dynamic RAM (SDRAM), a Flash memory, and so on.

In the embodiment shown in FIG. 2, a read operation with relative addressing is performed in two clock cycles. An absolute address is computed in the first clock cycle, and data is retrieved in the second clock cycle. This embodiment breaks up the total delay for the read operation and allows higher clock speed to be used for storage structure 200. A latch (not shown in FIG. 2) may receive the address information and provide its output to the second input of multiplexer 224. This latch would delay the absolute address to match the delay of the relative address. Alternatively, a register (also not shown in FIG. 2) may be added at the output of storage unit 230 to time align output data for a relative address with output data for an absolute address.

In another embodiment, latch 222 is not present, and the absolute address computation and data retrieval are performed in one clock cycle. In yet another embodiment, more than one latch may be inserted to further break up the total delay and support even higher clock speed.

Storage structure 200 may provide certain advantages. First, an absolute address may be computed on the fly based on the address information, e.g., the source ID included in an instruction. This feature may eliminate the need to have an address register for each thread of execution, which may provide noticeable savings for a multi-threaded processor. Second, ALU resources are not consumed to compute the absolute address. The saved ALU resources may be utilized for other operations. Third, an instruction with relative addressing is not converted to two instructions. This may reduce delay and improve throughput. There may be other benefits from using storage structure 200.

Figure 3:
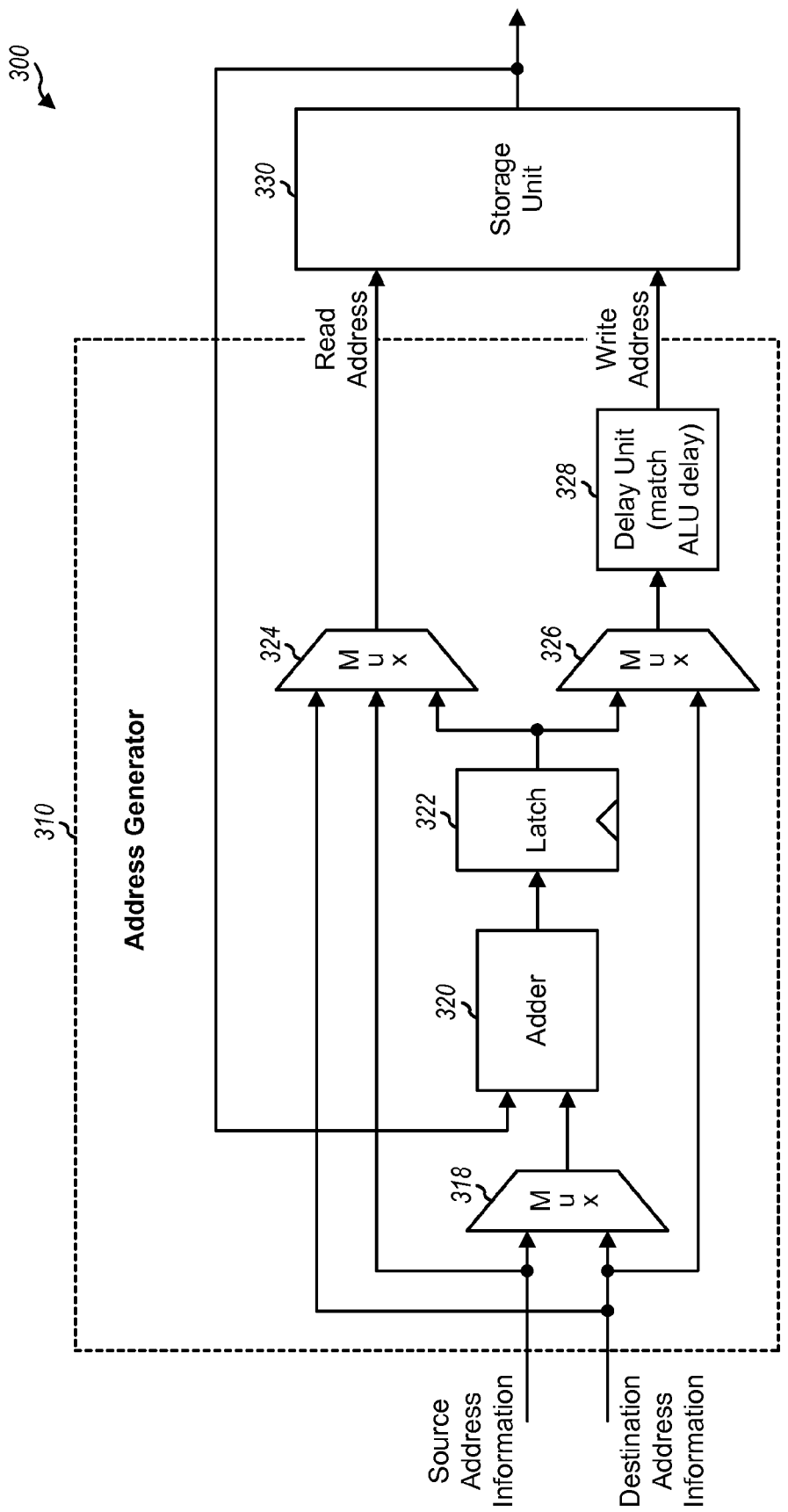
FIG. 3 shows a storage structure supporting read and write with relative addressing.

FIG. 3 shows a block diagram of an embodiment of a storage structure 300 that efficiently supports read and write with relative addressing. Storage structure 300 includes an address generator 310 and a storage unit 330. Address generator 310 receives source address information and destination address information. The source address information indicates a read address for a read operation and may comprise a source ID and an offset. The source ID may include an absolute address or a base address. The destination address information indicates a write address for a write operation and may comprise a destination ID and an offset. The destination ID may include an absolute address or a base address. The source ID and destination ID may be part of an instruction or may come from other sources.

Within address generator 310, a multiplexer 318 receives the source address information and the destination address information at two inputs and provides one of the two inputs to an adder 320. Adder 320 also receives an output from storage unit 330, sums the two inputs, and provides the result to a latch 322. A multiplexer 324 receives the output of latch 322, the source address information, and the destination address information on three inputs and provides one of the three inputs to storage unit 330. A multiplexer 326 receives the output of latch 322 and the destination address information on two inputs and provides one of the two inputs to a delay unit 328. Unit 328 provides a delay that matches the delay of an ALU (not shown in FIG. 3) that operates on the operands from storage unit 330. For example, if the ALU has a delay of four clock cycles, then unit 328 provides four clock cycles of delay. Unit 328 provides a write address to storage unit 330.

A read address may be computed from the source address information as follows. If the source address information comprises an absolute address, then multiplexer 324 provides the absolute address as the read address to storage unit 330. If the source address information comprises a relative address, then in the first clock cycle, multiplexer 318 provides the offset in the source address information to adder 320, multiplexer 324 provides the base address (e.g., the source ID) in the source address information to storage unit 330, and adder 320 sums the offset from multiplexer 318 with the base value from storage unit 330 and provides an absolute address to latch 322. In the second clock cycle, multiplexer 324 provides the absolute address from latch 322 as the read address to storage unit 330.

A write address may be computed from the destination address information as follows. If the destination address information comprises an absolute address, then multiplexer 326 provides the absolute address as the write address to storage unit 330. If the destination address information comprises a relative address, then in the first clock cycle, multiplexer 318 provides the offset in the destination address information to adder 320, multiplexer 324 provides the base address (e.g., the destination ID) in the destination address information to storage unit 330, and adder 320 sums the offset from multiplexer 318 with the base value from storage unit 330 and provides an absolute address to latch 322. In the second clock cycle, multiplexer 326 provides the absolute address from latch 322 as the write address to storage unit 330.

Figure 4:
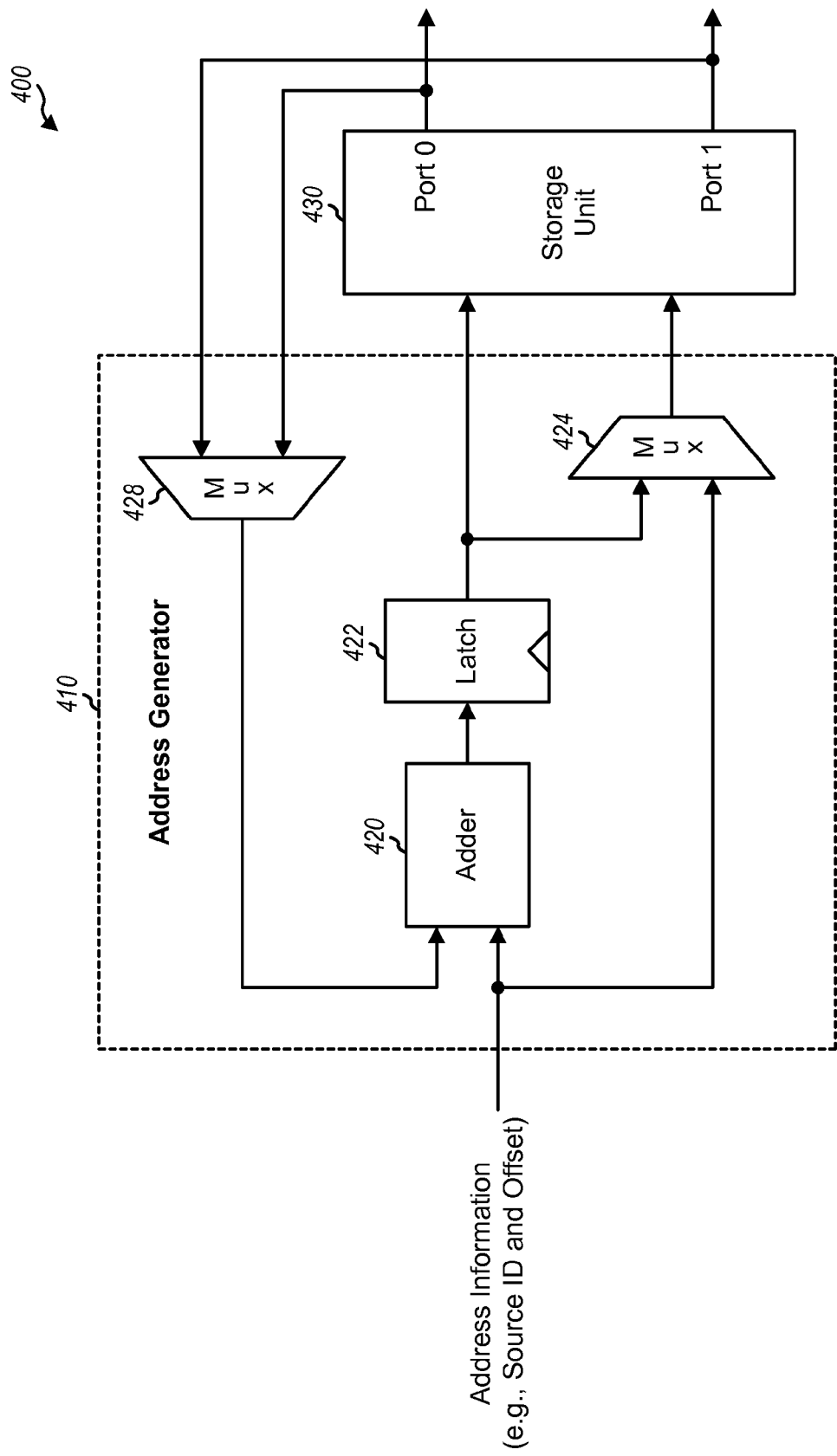
FIG. 4 shows a dual-port storage structure supporting relative addressing.

FIG. 4 shows a block diagram of an embodiment of a dual-port storage structure 400 that efficiently supports relative addressing. Storage structure 400 includes an address generator 410 and a storage unit 430. Storage unit 430 has two read ports that can provide data at two locations in one clock cycle. Address generator 410 includes an adder 420, a latch 422, and a multiplexer 424 that are coupled in the same manner as adder 220, latch 222, and multiplexer 224 in FIG. 2. Address generator 410 further includes a multiplexer 428 having two inputs coupled to the two read ports and an output coupled to adder 420. A controller or a resource manager (not shown in FIG. 4) may generate the control signals for multiplexers 424 and 428 based on the address information in the instructions being executed.

The two read ports support retrieval of data for two memory accesses (e.g., by two instructions) in a staggered manner. For example, an absolute address for a first instruction may be computed in a first clock cycle by providing a base address via multiplexer 424 to storage unit 430 and obtaining a base value via port 0. In a second clock cycle, data for the first instruction may be retrieved by providing the absolute address from latch 422 to storage unit 430 and obtaining the data via port 0. Also in the second clock cycle, an absolute address for a second instruction may be computed by providing a base address via multiplexer 424 to storage unit 430 and obtaining a base value via port 1. In a third clock cycle, data for the second instruction may be retrieved by providing the absolute address from latch 422 to storage unit 430 and obtaining the data via port 1.

In another embodiment, one port (e.g., port 0) is designated to provide base values for relative addresses, and the other port (e.g., port 1) is designated to provide data. In this embodiment, multiplexer 428 may be omitted, and port 0 of storage unit 430 may be coupled directly to adder 420. A crossbar may couple the outputs of latch 422 and multiplexer 424 to the two address inputs of storage unit 430.

The two read ports support one read operation per clock cycle, with each read operation having a delay of two clock cycles. In the embodiment shown in FIG. 4, a single adder 420 can compute an absolute address in each clock cycle. The two read ports can support concurrent address generation and data retrieval.

Storage unit 430 may also include two write ports (not shown in FIG. 4) to support writing of data for two memory accesses in a staggered manner.

The techniques described herein may be used for various types of processors that support relative addressing. For example, the techniques may be used for graphics processors, graphics processing units (GPUs), digital signal processors (DSPs), reduced instruction set computers (RISCs), advanced RISC machines (ARMs), controllers, microprocessors, etc. Exemplary use of the techniques for a graphics processor is described below.

Figure 5:
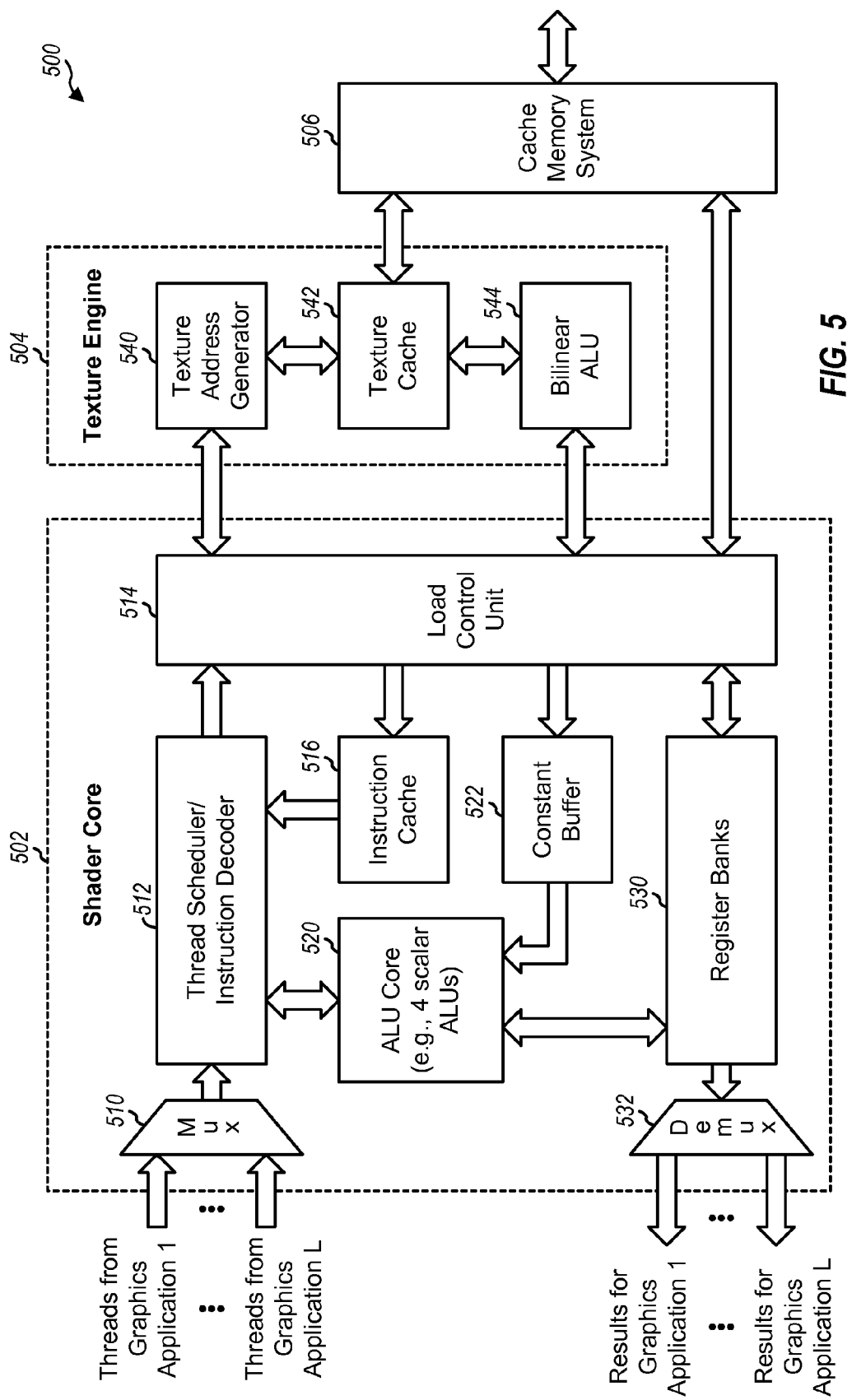
FIG. 5 shows a graphics processor.

FIG. 5 shows a block diagram of an embodiment of a graphics processor 500 that supports L graphics applications/programs, where in general $L \geq 1$. The L graphics applications may be for video games, graphics, etc., and may run concurrently. Graphics processor 500 includes a shader core 502, a texture engine 504, and a cache memory system 506. The terms "core", "engine", "machine", "processor" and "processing unit" are often used interchangeably. Shader core 502 may perform graphics operations such as shading, which is a highly complex operation involving lighting, shadowing, etc. Texture engine 504 may perform graphics operations such as texture mapping, which involves modifying the color of pixels of an image with the color of a texture table. Cache memory system 506 may include one or more caches, which are fast memories that can store data and instructions for shader core 502 and texture engine 504.

Within shader core 502, a multiplexer 510 receives threads from the L graphics applications and provides these threads to a thread scheduler/instruction decoder 512. Thread scheduler 512 performs various functions to schedule and manage execution of the threads. An instruction cache 516 stores instructions for the threads. These instructions indicate specific operations to be performed for each thread and may be loaded from cache memory system 506 and/or a main memory. An ALU core 520 performs arithmetic operations, logical operations, format conversion, etc. A constant buffer 522 stores constant values used by ALU core 520. A load control unit 514 controls the flow of data and instructions for various units within shader core 502 and texture engine 504. Register banks 530 stores intermediate and final results from ALU core 520 and ALU 544. A demultiplexer (Demux) 532 receives the final results for the executed threads from register banks 530 and provides these results to the graphics applications.

Within texture engine 504, a texture address generator 540 computes the position of each pixel to be operated on by texture engine 504. A texture cache 542 stores pixels for texture engine 504. ALU 544 performs computation on the pixels and provides intermediate results, which may be stored back in register banks 530.

Figure 6:
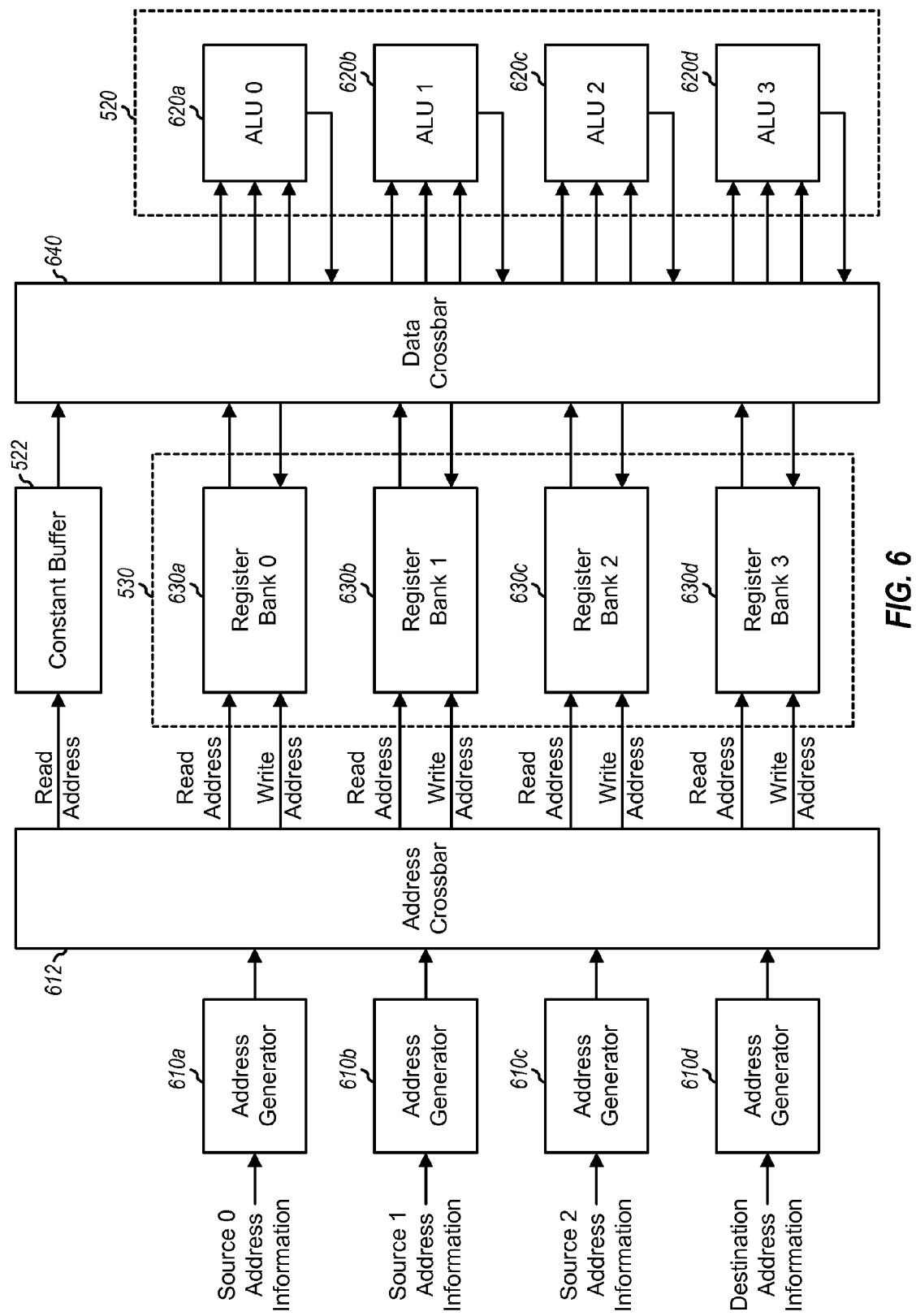
FIG. 6 shows an ALU core and register banks within the graphics processor.

FIG. 6 shows an embodiment of ALU core 520 and register banks 530 within shader core 502 in FIG. 5. In this embodiment, ALU core 520 includes four scalar ALUs 620a, 620b, 620c and 620d. Each ALU 620 may receive up to three input operands from a data crossbar 640, perform an arithmetic or logical operation on the input operands, and provides the result back to data crossbar 640.

In the embodiment shown in FIG. 6, register banks 530 include four register banks 630a, 630b, 630c and 630d, which may store graphics data as described below. Three address generators 610a, 610b and 610c receive source address information for three operands and generate read addresses for these operands. An address generator 610d receives destination address information and generates a write address for the result. The instruction decoder within thread scheduler 512 may provide the address information to each address generator 610. Each address generator 610 may be implemented with address generator 200 in FIG. 2 or address generator 400 in FIG. 4. An address crossbar 612 provides the three read addresses and the write address to the proper register banks 630 and constant buffer 522.

Each register bank 630 may receive a read address from one of the three address generators 610a through 610c and, for a read operation, provides data at the location indicated by the read address to data crossbar 640. Each register bank 630 may also receive the write address from address generator 610d and, for a write operation, stores data from data crossbar 640 at the location indicated by the write address.

In an embodiment, all four register banks 630a through 630d may be accessed (read from and/or written to) simultaneously. In general, each register bank 630 may include any number of read ports and any number of write ports. In an embodiment, each register bank 630 includes two read ports and two write ports. The two read ports allow for retrieval of data for two read operations in a staggered manner. The two write ports allow for writing of data for two write operations in a staggered manner.

Data crossbar 640 receives data from register banks 630a through 630d and constant buffer 522 and provides up to three operands to each ALU 620. In general, the input operands for each ALU 620 may come from any of the four register banks 630a through 630d and/or constant buffer 522. The result from each ALU 620 may also be stored in any one of the four register banks 630a through 630d.

Register banks 530 may store data for pixels to be operated on by shader core 502 and/or texture engine 504. A 2-dimensional (2-D) or 3-dimensional (3-D) image may be represented with polygons (typically triangles). Each triangle may be composed of pixels. Each pixel may have various attributes such as space coordinates, color values, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color values may be given by three components r, g and b or four components r, g, b and a, where r is red, g is green, b is blue, and a is a transparency factor that determines the transparency of a pixel. Texture coordinates are typically given by horizontal and vertical coordinates, u and v. A pixel may also be associated with other attributes.

FIG. 7 shows an embodiment of storing graphics data for pixels in register banks 630a through 630d in FIG. 6. In this embodiment, each register bank 630 stores a different component of space coordinates, a different component of color values, and one component of texture coordinates. In particular, register bank 630a stores horizontal (x) space coordinate, red (r) color value, and horizontal (u) texture coordinate. Register bank 630b stores vertical (y) space coordinate, green (g) color value, and vertical (v) texture coordinate. Register bank 630c stores depth (z) space coordinate, blue (b) color value, and horizontal (u) texture coordinate. Register bank 630d stores homogeneous (w) space coordinate, transparency (a) color value, and vertical (v) texture coordinate. This embodiment may allow for efficient retrieval of data for ALUs 620a through 620d and efficient storage of results from the ALUs. In general, the data for pixels may be stored in any manner, e.g., each register bank may store all components of an attribute for a pixel.

Each thread to be executed may be allocated a sufficient number of registers in the four register banks 630a through 630d. In the example shown in FIG. 7, each thread includes data for four pixels, which are denoted as P0, P1, P2 and P3. For thread 0, horizontal space coordinates for the four pixels (P0.X, P1.X, P2.X and P3.X) are stored in register 0 of register bank 630a, red color values for the four pixels (P0.R, P1.R, P2.R and P3.R) are stored in register 1 of register bank 630a, horizontal texture coordinates for the four pixels (P0.u0, P1.u0, P2.u0 and P3.u0) are stored in register 2 of register bank 630a, and horizontal texture coordinates for the four pixels (P0.u2, P1.u2, P2.u2 and P3.u2) are stored in register 3 of register bank 630a. u0 and v0, u1 and v1, u2 and v2, and u3 and v3 are texture coordinates for four texture maps that may be used for texturing. The other components of the four pixels for thread 0 are stored in registers 0 through 3 of register banks 630b, 630c and 630d, as shown in FIG. 7. The components of the pixels for thread 1, 2 and 3 are also stored in the four register banks 630a through 630d, as shown in FIG. 7.

Figure 8:
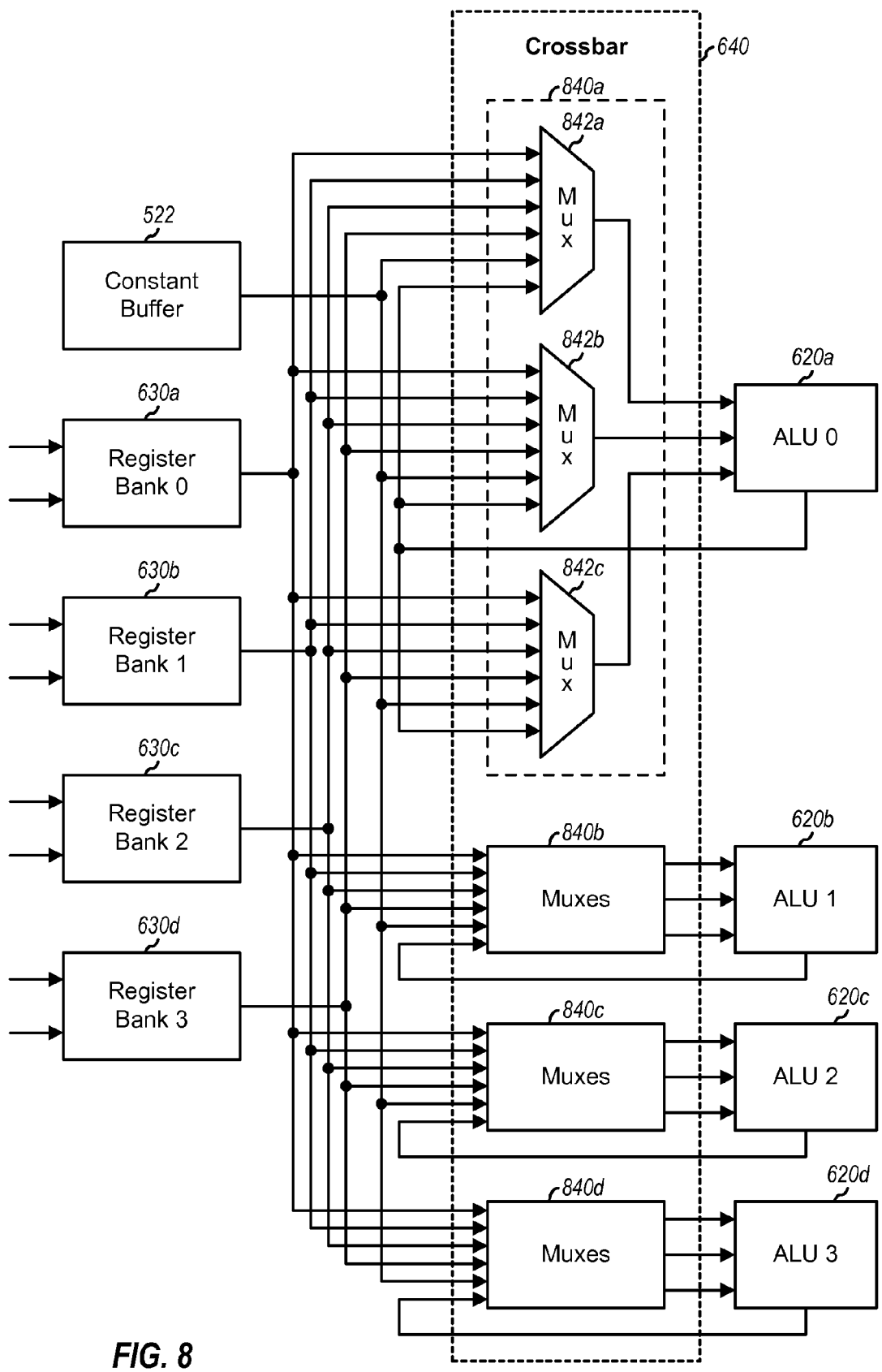
FIG. 8 shows a data crossbar coupling the register banks to the ALU core.

FIG. 8 shows an embodiment of data crossbar 640 in FIG. 6. In this embodiment, data crossbar 640 includes four multiplexer sets 840a through 840d for the four ALUs 620a through 620d, respectively. Multiplexer set 840a includes three multiplexers 842a, 842b and 842c for three input operands for ALU 620a. Each multiplexer 842 receives data from the four register banks 630a through 630d, data from constant buffer 522, and result from ALU 620a at six inputs. Each multiplexer 842 provides one of the six inputs as one input operand for ALU 620a. As shown in FIG. 8, each register bank 620 may provide any one of the three input operands for ALU 620a. Multiplexer sets 840b, 840c and 840d may each be implemented in the same manner as multiplexer set 840a. Multiplexer sets 840a through 840d may receive different control signals, which may be determined by the instructions being executed.

In general, instructions may be vector-based or pixel-based, and the ALUs may also be vector-based or pixel-based. Vector-based refers to parallel access or processing of up to four components of one pixel at a time. Pixel-based refers to parallel access or processing of one component for up to four pixels at a time. In an embodiment, instructions are vector-based, and the ALUs are pixel-based. Vector-based instructions allow for omission of computation for invalid pixels. Pixel-based ALUs allow for computation of only the components of interest. For example, to sum two space components x and y, the four ALUs may efficiently perform this computation on four pixels in the same clock cycle. Vector-based instructions and pixel-based ALUs may thus improve overall performance.

The embodiment shown in FIGS. 6 through 8 supports efficient retrieval of data from the four register banks 630a through 630d and efficient operation on the retrieved data by the four ALUs 620a through 620d. As an example, two space components x and y for four pixels may be summed. Address generators 610a and 610b may generate read addresses for register bank 630a and 630b, and address generator 610d may generate a write address for the result. In one read cycle, register bank 630a provides the x space component for the four pixels, and register bank 630b provides the y space component for the four pixels. Data crossbar 640 provides the x and y components for the first, second, third, and fourth pixels to ALUs 620a, 620b, 620c and 620d, respectively. Each ALU 620 operates on the x and y components for one pixel. Data crossbar 640 then provides the results from the four ALUs 620a and 620d to the designated register bank, which stores the results at the write address computed by address generator 610d. Register banks that are not accessed by ALUs 620 may be accessed by other units (e.g., load control unit 514) within graphics processor 500.

The techniques described herein may be used for wireless communication, computing, networking, personal electronics, etc. An exemplary use of the techniques for wireless communication is described below.

Figure 9:
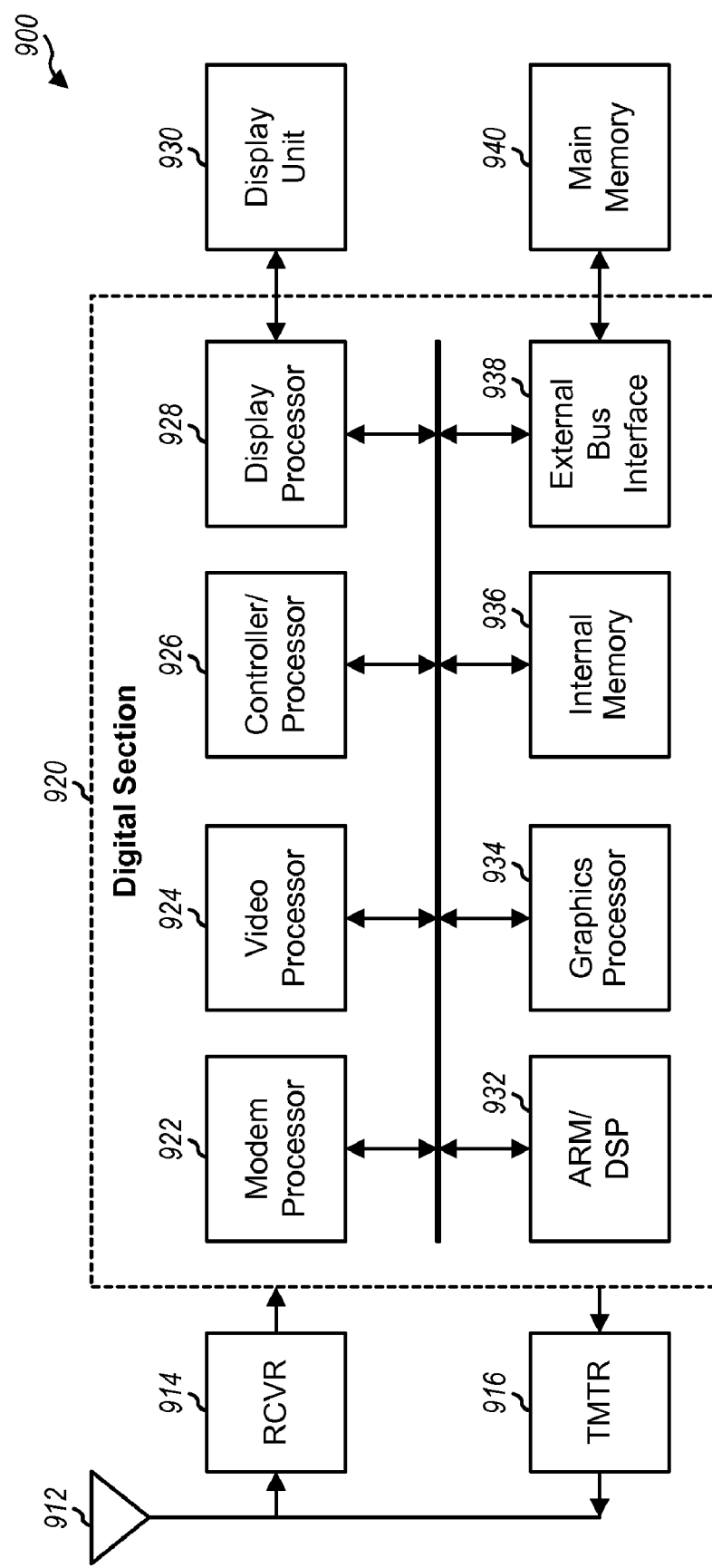
FIG. 9 shows a block diagram of a wireless device.

FIG. 9 shows a block diagram of an embodiment of a wireless device 900 in a wireless communication system. Wireless device 900 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 900 is capable of providing bi-directional communication via a receive path and a transmit path. On the receive path, signals transmitted by base stations are received by an antenna 912 and provided to a receiver (RCVR) 914. Receiver 914 conditions and digitizes the received signal and provides samples to a digital section 920 for further processing. On the transmit path, a transmitter (TMTR) 916 receives data to be transmitted from digital section 920, processes and conditions the data, and generates a modulated signal, which is transmitted via antenna 912 to the base stations.

Digital section 920 includes various processing, interface and memory units such as, for example, a modem processor 922, a video processor 924, a controller/processor 926, a display processor 928, an ARM/DSP 932, a graphics processor 934, an internal memory 936, and an external bus interface (EBI) 938. Modem processor 922 performs processing for data transmission and reception (e.g., encoding, modulation, demodulation, and decoding). Video processor 924 performs processing on video content (e.g., still images, moving videos, and moving texts) for video applications such as camcorder, video playback, and video conferencing. Controller/processor 926 may direct the operation of various processing and interface units within digital section 920. Display processor 928 performs processing to facilitate the display of videos, graphics, and texts on a display unit 930. ARM/DSP 932 may perform various types of processing for wireless device 900. Graphics processor 934 performs graphics processing and may be implemented as shown in FIG. 5. The techniques described herein may be used for any of the processors in digital section 920, e.g., graphics processor 934. Internal memory 936 stores data and/or instructions for various units within digital section 920. EBI 938 facilitates transfer of data between digital section 920 (e.g., internal memory 936) and a main memory 940.

Digital section 920 may be implemented with one or more DSPs, micro-processors, RISCs, etc. Digital section 920 may also be fabricated on one or more application specific integrated circuits (ASICS) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A processor comprising:
   an address generator operative to receive a relative address comprised of a base address and an offset, to obtain a base value for the base address, to sum the base value with the offset, and to provide an absolute address corresponding to the relative address, the address generator comprising a multiplexer operative to provide the absolute address or the base address to a storage unit; and
   the storage unit operative to receive the absolute address or the base address and provide the base value to the address generator in response to receiving the base address.

2. The processor of claim 1, wherein the address generator derives the absolute address in a first clock cycle of a memory access, and wherein the storage unit is accessed at the absolute address in a second clock cycle of the memory access.

3. The processor of claim 1, wherein the address generator comprises
   an adder operative to sum the base value and the offset.

4. The processor of claim 3, wherein the address generator further comprises
   a latch coupled to the adder and operative to store an output of the adder and to provide the absolute address.

5. The processor of claim 4, wherein the multiplexer is coupled to the latch and is operative to provide the absolute address from the latch or the base address to the storage unit.

6. The processor of claim 5, wherein the multiplexer is operative to provide the base address to the storage unit in a first clock cycle of a memory access and to provide the absolute address to the storage unit in a second clock cycle of the memory access.

7. The processor of claim 4, wherein the multiplexer is a second multiplexer of the address generator and the address generator further comprises
   a first multiplexer operative to receive source address information and destination address information and to provide the offset to the adder,
   wherein the second multiplexer is operative to receive the source address information and an output of the latch, to provide the base address from the source address information in a first clock cycle of a read operation, and to provide the output of the latch in a second clock cycle of the read operation.

8. The processor of claim 7, wherein the address generator further comprises
   a third multiplexer operative to receive the destination address information and the output of the latch and to provide the absolute address for a write operation.

9. The processor of claim 8, wherein the address generator further comprises
   a delay unit operative to receive an output of the third multiplexer and to provide a write address for the write operation.

10. The processor of claim 3, wherein the storage unit comprises first and second ports, and wherein the address generator is operative to receive the base value from the first port or the second port.

11. The processor of claim 1, wherein the storage unit is a bank of registers.

12. The processor of claim 1, wherein the storage unit is a random access memory (RAM), a synchronous RAM (SRAM), or asynchronous dynamic RAM (SDRAM).

13. An integrated circuit comprising:
    an address generator operative to receive a relative address comprised of a base address and an offset, to obtain a base value for the base address, to sum the base value with the offset, and to provide an absolute address corresponding to the relative address, the address generator comprising a multiplexer operative to provide the absolute address or the base address to a storage unit; and
    the storage unit operative to receive the absolute address or the base address and provide the base value to the address generator in response to receiving the base address.

14. The integrated circuit of claim 13, wherein the address generator derives the absolute address in a first clock cycle of a memory access, and wherein the storage unit is accessed at the absolute address in a second clock cycle of the memory access.

15. The integrated circuit of claim 13, wherein the address generator comprises
    an adder operative to sum the base value and the offset, and
    a latch coupled to the adder and operative to store an output of the adder and to provide the absolute address.

16. The integrated circuit of claim 15, wherein the multiplexer is coupled to the latch and is operative to provide the base address to the storage unit in a first clock cycle of a memory access and to provide the absolute address to the storage unit in a second clock cycle of the memory access.

17. A processor comprising:

a plurality of address generators operative to receive relative addresses and provide absolute addresses;
a plurality of register banks coupled to the plurality of address generators and operative to receive the absolute addresses and provide data at the absolute addresses, wherein each register bank comprises at least two read ports, one read port operative to provide a base value for one memory access and another read port operative to provide data for another memory access; and
a crossbar operative to couple outputs of the plurality of address generators to the plurality of register banks.

18. The processor of claim 17, wherein the plurality of address generators comprise
at least two address generators operative to provide at least two absolute addresses for at least two operands, and
an address generator operative to provide an absolute address for result.

19. The processor of claim 17, wherein the plurality of register banks are operative to receive base addresses and to provide base values, and wherein the plurality of address generators are operative to sum offsets for the relative addresses with the base values to obtain the absolute addresses.

20. The processor of claim 17, further comprising:
a plurality of arithmetic logic units (ALUs) configured to operate on the data from the plurality of register banks.

21. The processor of claim 20, wherein the plurality of ALUs are configured to operate on data for a plurality of pixels concurrently.

22. The processor of claim 20, further comprising:
a crossbar operative to provide the data from the plurality of register banks to the plurality of ALUs.

23. A processor comprising:
a plurality of address generators operative to receive relative addresses and provide absolute addresses;
a plurality of register banks coupled to the plurality of address generators and operative to receive the absolute addresses and provide data at the absolute addresses, wherein the plurality of register banks comprise four register banks operative to store four components of an attribute for pixels, each register bank storing a different one of the four components; and
a cross bar operative to couple outputs of the plurality of address generators to the plurality of register banks.

24. A graphics processor comprising:
a plurality of address generators operative to receive relative addresses and provide absolute addresses;
a plurality of register banks coupled to the plurality of address generators and operative to receive the absolute addresses and provide graphics data at the absolute addresses, wherein each register bank comprises at least two read ports, one read port operative to provide a base value for one memory access and another read port operative to provide data for another memory access; and
a plurality of arithmetic logic units (ALUs) configured to operate on the graphics data from the plurality of register banks; and
a crossbar operative to couple outputs of the plurality of address generators to the plurality of register banks.

25. The graphics processor of claim 24, wherein the plurality of address generators comprise
at least two address generators operative to provide at least two absolute addresses for at least two operands for the plurality of ALUs, and
an address generator operative to provide an absolute address for results from the plurality of ALUs.

26. A wireless device comprising:
a graphics processor comprising a plurality of address generators and a plurality of register banks, the plurality of address generators operative to receive relative addresses and provide absolute addresses, the plurality of register banks operative to receive the absolute addresses and provide graphics data at the absolute addresses, wherein each register bank comprises at least two read ports, one read port operative to provide a base value for one memory access and another read port operative to provide data for another memory access, and a crossbar operative to couple outputs of the plurality of address generators to the plurality of register banks; and
a memory coupled to the graphics processor.

27. An apparatus comprising:
a processor comprising:
a plurality of address generators, each address generator coupled to a storage unit and operative to receive a relative address comprised of a base address and an offset, to obtain a base value for the base address, to sum the base value with the offset, and to provide an absolute address corresponding to the relative address, the address generator comprising a multiplexer operative to provide the absolute address or the base address to the storage unit; and
a plurality of storage units operative to receive the absolute address or the base address and provide the base value to the address generator in response to receiving the base address.

28. The apparatus of claim 27, wherein the plurality of storage units comprise a plurality of register banks.

29. The apparatus of claim 28, further comprising:
a crossbar operative to couple outputs of the plurality of address generators to the plurality of register banks.

30. The apparatus of claim 28, further comprising:
a plurality of arithmetic logic units (ALUs) configured to operate on the data from the plurality of register banks.

31. The apparatus of claim 30, further comprising:
a crossbar operative to provide the data from the plurality of register banks to the plurality of ALUs.

32. The apparatus of claim 27, wherein the processor comprises a graphics processor.

33. The apparatus of claim 27, wherein the apparatus comprises a wireless device.

34. A processor comprising:
means for receiving a relative address comprised of a base address and an offset;
means for obtaining a base value for the base address;
means for summing the base value with the offset to derive an absolute address; and
means to selectively provide the absolute address or the base address to a storage unit, wherein the storage unit is operative to receive the absolute address or the base address and provide the base value to the address generator in response to receiving the base address.

35. A method of deriving an absolute address comprising:
receiving a relative address comprised of a base address and an offset;
obtaining a base value for the base address;
summing the base value with the offset to derive an absolute address; and
selectively providing the absolute address or the base address to a storage unit, wherein the storage unit is operative to receive the absolute address or the base address and provide the base value to the address generator in response to receiving the base address.

36. A computer-program product comprising a computer-readable medium having instructions thereon which, when loaded in a programmable circuit configure the circuit to:
   receive a relative address comprised of a base address and an offset;
   obtain a base value for the base address;
   sum the base value with the offset to derive an absolute address; and
   selectively provide the absolute address or the base address to a storage unit, wherein the storage unit is operative to receive the absolute address or the base address and provide the base value to the address generator in response to receiving the base address.

* * * * *